United States Patent
Bloomfield et al.

(10) Patent No.: US 12,090,592 B2
(45) Date of Patent: Sep. 17, 2024

(54) DROP DETECTION IN POWER TOOLS

(71) Applicant: MILWAUKEE ELECTRIC TOOL CORPORATION, Brookfield, WI (US)

(72) Inventors: Joseph G. Bloomfield, Wauwautosa, WI (US); Arik A. Miller, Shorewood, WI (US); Daniel J. Tomcheck, Denmark, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/840,366

(22) Filed: Jun. 14, 2022

(65) Prior Publication Data

US 2022/0395951 A1    Dec. 15, 2022

Related U.S. Application Data

(60) Provisional application No. 63/210,573, filed on Jun. 15, 2021.

(51) Int. Cl.
*B23Q 11/00* (2006.01)

(52) U.S. Cl.
CPC ...... *B23Q 11/0092* (2013.01); *B23Q 2717/00* (2013.01)

(58) Field of Classification Search
CPC .................. B23Q 11/0092; B23Q 2717/00
See application file for complete search history.

(56) References Cited

U.S. PATENT DOCUMENTS

| | | | |
|---|---|---|---|
| 6,236,177 B1 | 5/2001 | Zick et al. | |
| 6,261,036 B1 * | 7/2001 | Bosten | B27C 5/10 409/206 |
| 7,253,541 B2 | 8/2007 | Kovarik et al. | |
| 7,282,818 B2 | 10/2007 | Kovarik | |
| 10,630,223 B2 | 4/2020 | Yamaguchi et al. | |
| 2010/0206430 A1* | 8/2010 | Pozgay | B23Q 9/0028 144/136.95 |
| 2012/0279742 A1 | 11/2012 | Roser | |

(Continued)

FOREIGN PATENT DOCUMENTS

| | | |
|---|---|---|
| DE | 102011007403 A1 | 10/2012 |
| DE | 102018214811 A1 | 3/2020 |

(Continued)

OTHER PUBLICATIONS

International Search Report and Written Opinion for Application No. PCT/US2022/033466 dated Oct. 12, 2022 (11 pages).

*Primary Examiner* — Tanzim Imam

(74) *Attorney, Agent, or Firm* — Michael Best & Friedrich LLP

(57) ABSTRACT

A power tool comprising a power tool housing and a motor within the power tool housing. The motor including a rotor and a stator, the rotor coupled to a motor shaft to produce a rotational output. The power tool further includes a sensor within the power tool housing, the sensor configured to sense a free fall of the power tool, generate an output signal related to the sensed free fall. The power tool further includes a controller including a processor and a memory, the controller configured to receive the output signal from the sensor, detect the free fall of the power tool based on the output signal from the sensor, and brake the motor when the free fall of the power tool is detected.

20 Claims, 5 Drawing Sheets

(56) References Cited

U.S. PATENT DOCUMENTS

| | | | |
|---|---|---|---|
| 2013/0120103 A1* | 5/2013 | Nazzaro | H01C 1/082 |
| | | | 338/55 |
| 2013/0226754 A1 | 8/2013 | Boldyrev et al. | |
| 2017/0008159 A1* | 1/2017 | Boeck | G05B 19/00 |
| 2017/0129091 A1 | 5/2017 | Schiegel et al. | |
| 2017/0173768 A1* | 6/2017 | Dey, IV | B25B 21/02 |
| 2017/0354088 A1* | 12/2017 | Yuki | B60L 7/14 |
| 2019/0013762 A1* | 1/2019 | Yamaguchi | H02P 29/0022 |
| 2019/0043292 A1* | 2/2019 | Hoossainy | G07C 9/00309 |
| 2019/0063679 A1* | 2/2019 | Mergener | F16P 3/147 |
| 2019/0344421 A1* | 11/2019 | Lu | G01L 5/22 |
| 2020/0094392 A1* | 3/2020 | Larsen | B25F 5/001 |
| 2020/0103434 A1* | 4/2020 | Porano | A61B 6/4283 |
| 2020/0133229 A1* | 4/2020 | Girt | B25F 5/00 |
| 2020/0203986 A1 | 6/2020 | Barreau et al. | |
| 2020/0276680 A1* | 9/2020 | Green | H02K 11/21 |
| 2022/0115966 A1* | 4/2022 | Xu | H02P 6/24 |

FOREIGN PATENT DOCUMENTS

| | | |
|---|---|---|
| DE | 102020207520 A1 | 3/2021 |
| EP | 2474391 B1 | 3/2018 |
| EP | 2656977 B1 | 1/2019 |
| JP | 2010137308 A | 6/2010 |
| JP | 2021509638 A | 4/2021 |
| WO | 2010067789 A1 | 6/2010 |
| WO | 2013072201 A2 | 5/2013 |
| WO | 2018177932 A1 | 10/2018 |
| WO | 2019057639 A1 | 3/2019 |
| WO | 2019137818 A1 | 7/2019 |
| WO | 2020260069 A1 | 12/2020 |
| WO | 2020260079 A1 | 12/2020 |

\* cited by examiner

DROP DETECTION IN POWER TOOLS

RELATED APPLICATION

This application claims the benefit of U.S. Provisional Patent Application No. 63/210,573, filed on Jun. 15, 2021, the entire content of which is hereby incorporated by reference.

FIELD

Embodiments described herein provide battery pack powered power tools.

SUMMARY

Power tools described herein include a power tool housing, a motor, a sensor, and a controller. The motor is within the power tool housing. The motor includes a rotor and a stator. The rotor is coupled to a motor shaft to produce a rotational output. The sensor is within the power tool housing. The sensor is configured to sense a free fall of the power tool and generate an output signal related to the sensed free fall. The controller includes a processor and a memory. The controller is configured to receive the output signal from the sensor, detect the free fall of the power tool based on the output signal from the sensor, and brake the motor when the free fall of the power tool is detected.

Methods described herein for controlling a power tool during a free fall of the power tool include sensing, using a sensor, the free fall of the power tool, generating, using the sensor, an output signal related to the free fall of the power tool, detecting the free fall of the power tool based on the output signal from the sensor, and braking a motor when the free fall of the power tool is detected.

Power tools described herein include a power tool housing, a motor, a sensor, and a controller. The motor is within the power tool housing. The motor includes a rotor and a stator. The rotor is coupled to a motor shaft to produce a rotational output. The sensor is within the power tool housing. The sensor is configured to generate an output signal related to a free fall of the power tool. The controller includes a processor and a memory. The controller is configured to receive the output signal from the sensor, determine an amount of time that the power tool has been in free fall, compare the amount of time that the power tool has been in free fall to a predetermined time threshold, and brake the motor when the amount of time that the power tool has been in free fall is equal to or greater than the predetermined time threshold.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1A:
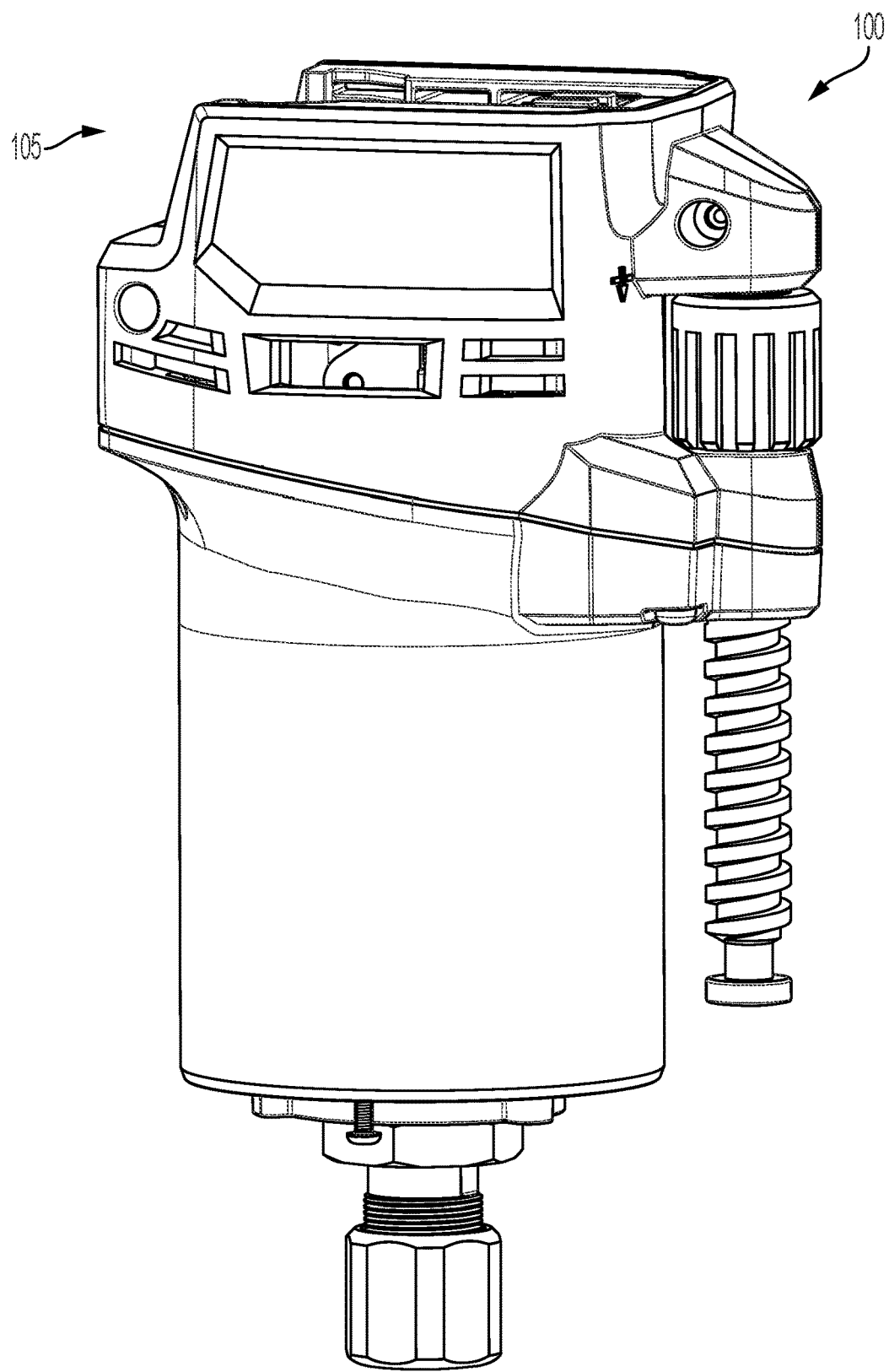
FIGS. 1A and 1B illustrate a power tool according to embodiments described herein.

FIG. 1A illustrates a device 100 that includes a controller. In the embodiment illustrated in FIG. 1A, the device is a power tool (e.g., a router). In other embodiments, the device 100 is a different type of power tool (e.g., a grinder, a drill/driver, an impact driver, a saw, a ratchet, an impact wrench, a hammer drill, a rotary hammer, a blower, a trimmer, etc.) or a different type of device (e.g., a light, a non-motorized sensing tool, etc.).

Figure 1B:
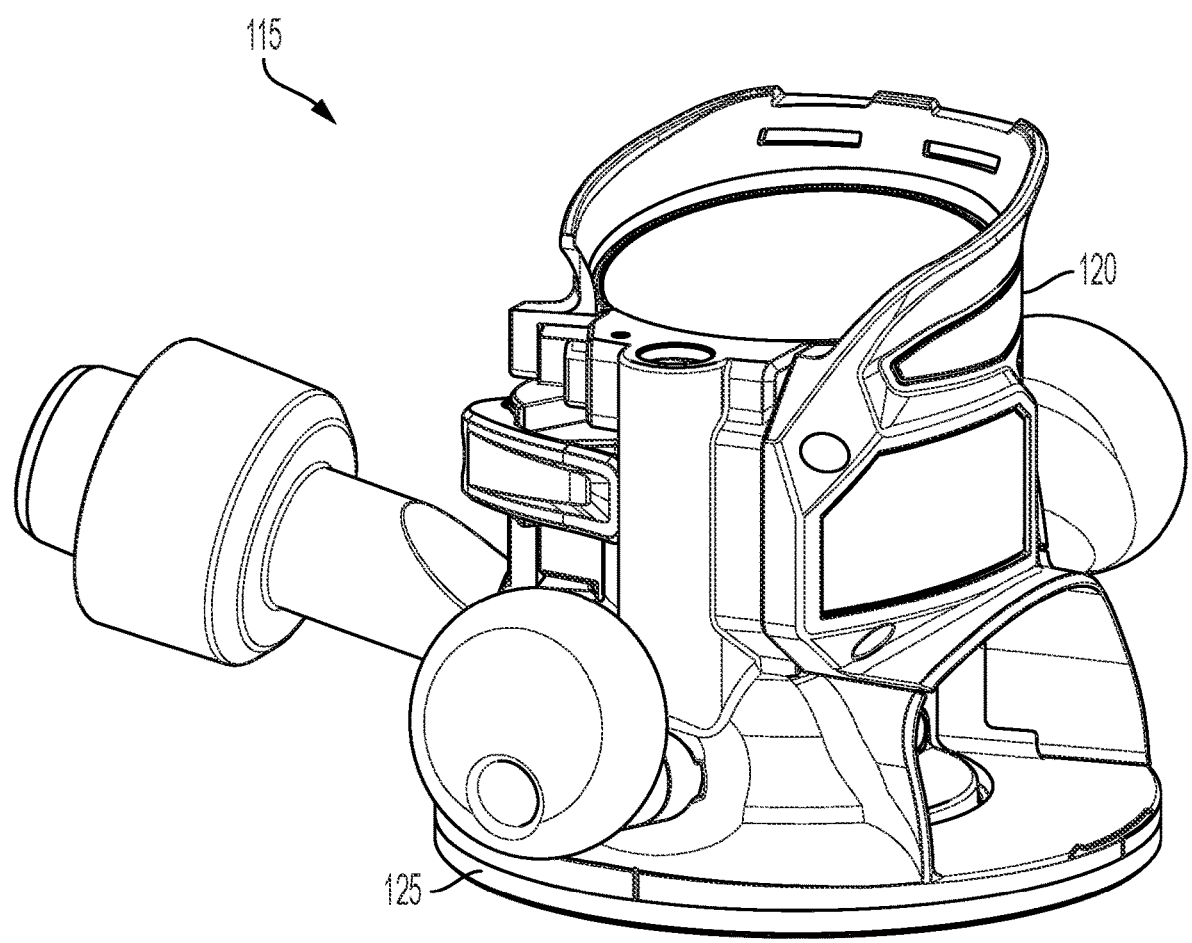
Figure 3:
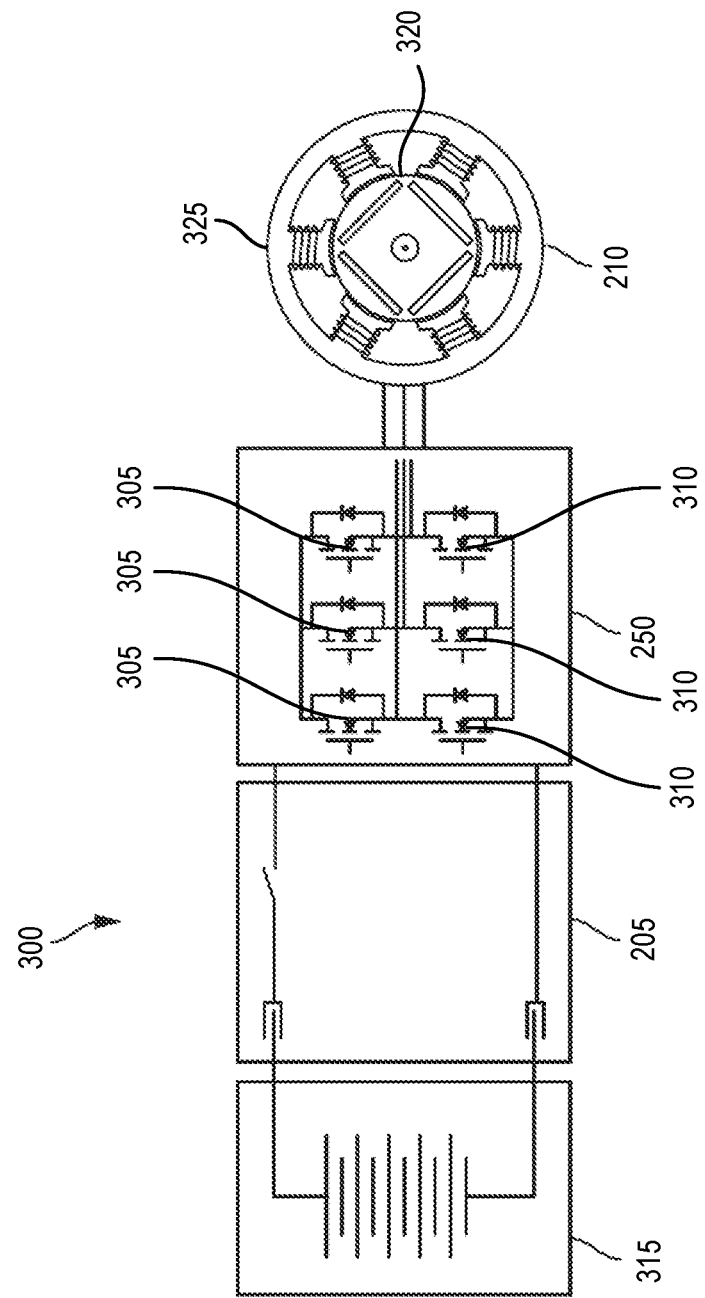
FIG. 3 illustrates a circuit diagram for a FET switching module according to embodiments described herein.

The device 100 includes an insertion interface 105 to attach battery pack (see FIG. 3). The battery pack is coupled to the device 100 and provides power to the device 100 to drive a motor. The motor is operable to drive a tool element to perform a desired operation (e.g., cut a workpiece, etc.). In some embodiment, the motor is an alternating current ("AC") motor or a direct current ("DC") motor. FIG. 1B illustrates a housing 115 for the device 100. The housing 115 includes a user interface (e.g., a handle) 120 for a user to easily control the device 100 and navigate the device 100 to perform the desired operation. A base 125 is configured to interface with a work surface (e.g., a surface of a workpiece), and steady the device 100 to perform the desired operation.

Figure 2:
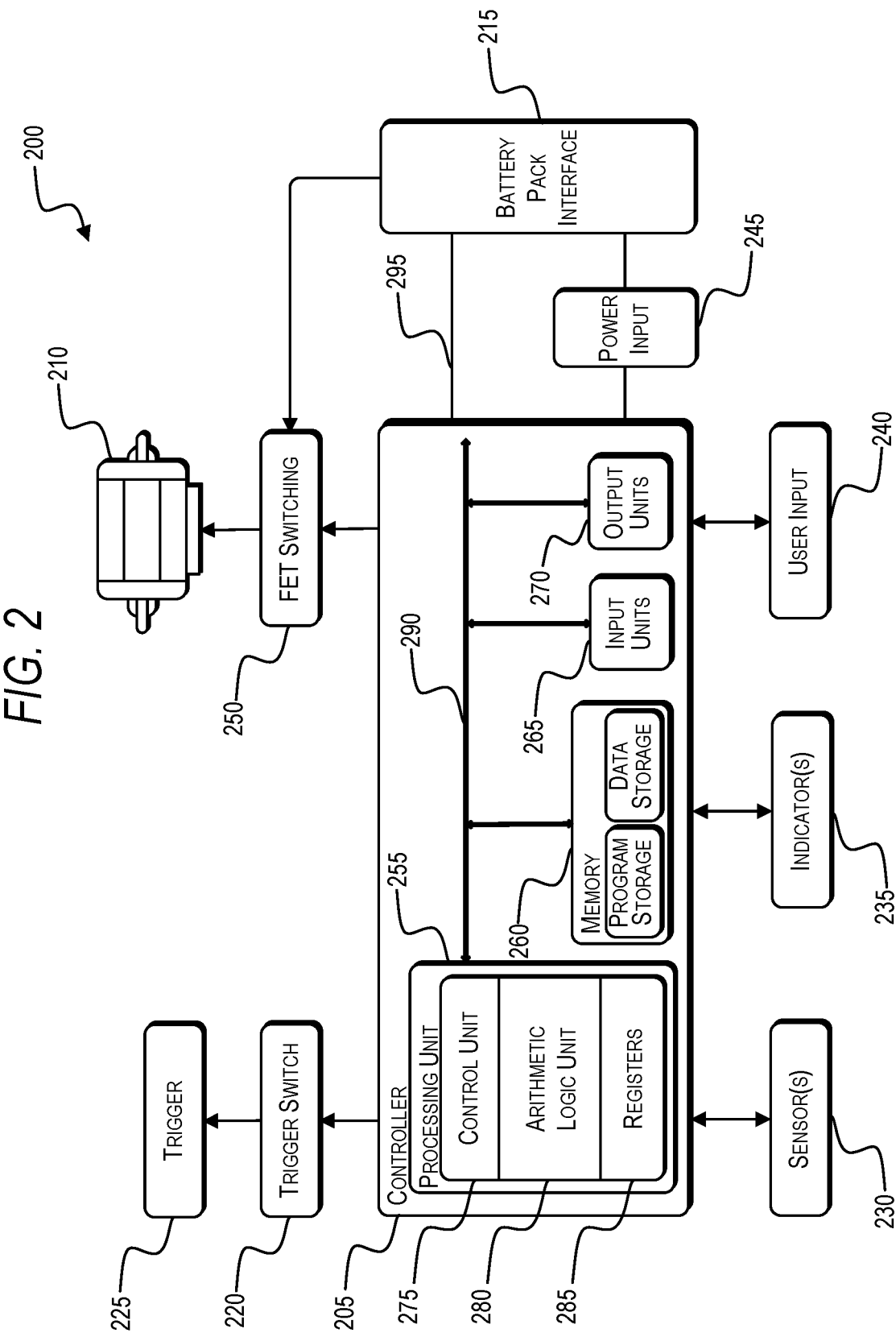
FIG. 2 illustrates a control system for the power tool of FIGS. 1A and 1B according to embodiments described herein.

FIG. 2 illustrates a control system 200 for the device 100 that determines when the device 100 has been dropped. The control system 200 includes a controller 205. The controller 205 is electrically and/or communicatively connected to a variety of modules or components of the device 100. For example, the illustrated controller 205 is electrically connected to a motor 210, a battery pack interface 215, a trigger switch 220 (connected to a trigger 225), one or more sensors or sensing circuits 230, one or more indicators 235, a user input module 240, a power input module 245, and a FET switching module 250 (e.g., including a plurality of switching FETs). In other embodiments, different semiconductor switches are uses, such as insulated-gate bipolar transistors ("IGBTs"), bipolar junction transistors ("BJTs"), thyristors, silicon controlled rectifiers ("SCRs"), triacs, etc. In some embodiments, the at least one sensor or sensing circuit is mounted to a printed circuit board which is within the user interface (e.g., a handle) 120. In some embodiments, the sensor includes a variety of motion detecting sensors (e.g., a gyroscope, an accelerometer, in inertial measurement unit, etc.) to allow a free fall of the tool to be detected.

The controller 205 includes combinations of hardware and software that are operable to, among other things, control the operation of the device 100, monitor the operation of the device 100, activate the one or more indicators 235 (e.g., an LED), etc.

The controller 205 includes a plurality of electrical and electronic components that provide power, operational control, and protection to the components and modules within the controller 205 and/or the device 100. For example, the controller 205 includes, among other things, a processing unit 255 (e.g., a microprocessor, a microcontroller, an electronic processor, an electronic controller, or another suitable programmable device), a memory 260, input units 265, and output 270. The processing unit 255 includes, among other things, a control unit 275, an arithmetic logic unit ("ALU") 280, and a plurality of registers 285 (shown as a group of registers in FIG. 2), and is implemented using a known computer architecture (e.g., a modified Harvard architecture, a von Neumann architecture, etc.). The processing unit 255, the memory 260, the input units 265, and the output units 270, as well as the various modules or circuits connected to the controller 205 are connected by one or more control and/or data buses (e.g., common bus 290). In some embodiments, the memory 260 can store a plurality of data regarding the different characteristics of the dropping of the device 100.

The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 260 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 255 is connected to the memory 260 and executes software instructions that are capable of being stored in a RAM of the memory 260 (e.g., during execution), a ROM of the memory 260 (e.g., on a generally permanent basis), or another non-transitory computer readable medium such as another memory or a disc. Software included in the implementation of the device 100 can be stored in the memory 260 of the controller 205. The software includes, for example, firmware, one or more applications, program data, filters, rules, open or more program modules, and other executable instructions. The controller 200 is configured to retrieve from the memory 260 and execute, among other things, instructions related to the control processes and methods described herein. In other constructions, the controller 200 includes additional, fewer, or different components.

The battery pack interface 215 includes a combination of mechanical components (e.g., rails, grooves, latches, etc.) and electrical components (e.g., one or more terminals) configured to and operable for interfacing (e.g., mechanically, electrically, and communicatively connecting) the device 100 with a battery pack (e.g., the battery pack). For example, power provided by the battery pack to the device 100 is provided through the battery pack interface 215 to the power input module 245. The power input module 245 includes combinations of active and passive components to regulate or control the power received from the battery pack prior to power being provided to the controller 205. The battery pack interface 215 also supplies power to the FET switching module 250 to provide power to the motor 210. The battery pack interface 215 also includes, for example, a communication line 295 for providing a communication line or link between the controller 205 and the battery pack.

The indicators 235 include, for example, one or more light-emitting diodes ("LEDs"). The indicators 235 can be configured to display conditions of, or information associated with, the device 100. For example, the indicators 235 are configured to indicate measured electrical characteristics of the device 100, the status of the device 100, etc. The user input module 240 is operably coupled to the controller 205 to, for example, select a forward mode of operation or a reverse mode of operation, a torque and/or speed setting for the device 100 (e.g., using torque and/or speed switches), etc. In some embodiments, the user input module 240 includes a combination of digital and analog input or output devices required to achieve a desired level of operation for the device 100, such as one or more knobs, one or more dials, one or more switches, one or more buttons, etc.

The controller 205 is configured to determine whether a fault condition of the device 100 is present and generate one or more control signals related to the fault condition. For example, the sensing circuits 230 include one or more current sensors, one or more speed sensors, one or more Hall Effect sensors, one or more current sensors, a gyroscope, an accelerometer, and inertial measurement unit ("IMU"), etc. The controller 205 calculates or includes, within memory 260, predetermined operational threshold values and limits for operation of the device 100. For example, when a potential thermal failure (e.g., of a FET, the motor 210, etc.) is detected or predicted by the controller 205, power to the motor 210 can be limited or interrupted until the potential for thermal failure is reduced. In another example, if the sensor is disconnected, the controller 205 would detect that the sensor is unresponsive. If the controller 205 detects one or more such fault conditions of the device 100 or determines that a fault condition of the device 100 no longer exists, the controller 205 is configured to provide information and/or control signals to another component of the device 100 (e.g., the battery pack interface 215, the indicators 235, etc.).

FIG. 3 illustrates a circuit diagram 300 of the FET switching module 250. The FET switching module 250 includes a number of high side power switching elements 305 and a number of low side power switching elements 310. The controller 205 provides the control signals to control the high side FETs 305 and the low side FETs 310 to drive the motor 210 based on motor feedback information and user controls. For example, in response to detecting a pull of the trigger 225, the controller 205 provides the control signals to selectively enable and disable the FETs 305 and 310 (e.g., sequentially, in pairs) resulting in power from the power source 315 (e.g., battery pack) to be selectively applied to stator coils of the motor 210 to cause rotation of a rotor 320 relative to a stator 325. In some embodiments, the control signals include pulse width modulated (PWM) signals having a duty cycle that is set in proportion to the amount of trigger pull of the trigger 225, to thereby control the speed or torque of the motor 210.

More particularly, to drive the motor 210, the controller 205 enables a first high side FET 305 and first low side FET 310 pair (e.g., by providing a voltage at a gate terminal of the FETs) for a first period of time. In response to determining that the rotor of the motor 210 has rotated based on a pulse from the sensing circuits 330, the controller 205 disables the first FET pair, and enables a second high side FET 305 and a second low side FET 310. In response to determining that the rotor of the motor 210 has rotated based on pulse(s) from the sensing circuits 330, the controller 205 disables the second FET pair, and enables a third high side FET 305 and a third low side FET 310. This sequence of cyclically enabling pairs of high side FET 305 and low side FET 310 repeats to drive the motor 210.

When the controller 205 receives a signal to shut down the device 100, the controller 205 halts the motor 210. The low side FETs 310 are enabled and coincidingly shunts the motor's coils to ground. In some embodiments, the high side FETs 305 are shorted to shunt the motor's coils to the DC link bus. In other embodiments, a coast and brake method is implemented. After the release of the trigger or turning off of a switch, the motor 210's voltage begins to decay. A predetermined voltage value is set, so that once the motor's voltage decays to that predetermined voltage value, a brake is applied to the motor. The low-side FETs 310 are enabled and, again, will shunt the motor 210's coils to ground, halting the motor after the motor's voltage has already decayed to a certain point. In some embodiments, a brake may be applied to the motor by disconnecting the power being sent to the motor 210. The power is halted through a power switch being opened. In some embodiments, the power is halted through a solid-state disconnect ("SSD"). In some embodiments, with power removed from the motor, the controller 205 turns on at least one separate brake resistance or resistor via at least one switch (e.g., a FET) in order to dissipate energy from the motor. In some embodiments, additional or alternative braking techniques can be employed, such as plugging (i.e., reversing motor polarity), mechanical braking, etc.

Figure 4:
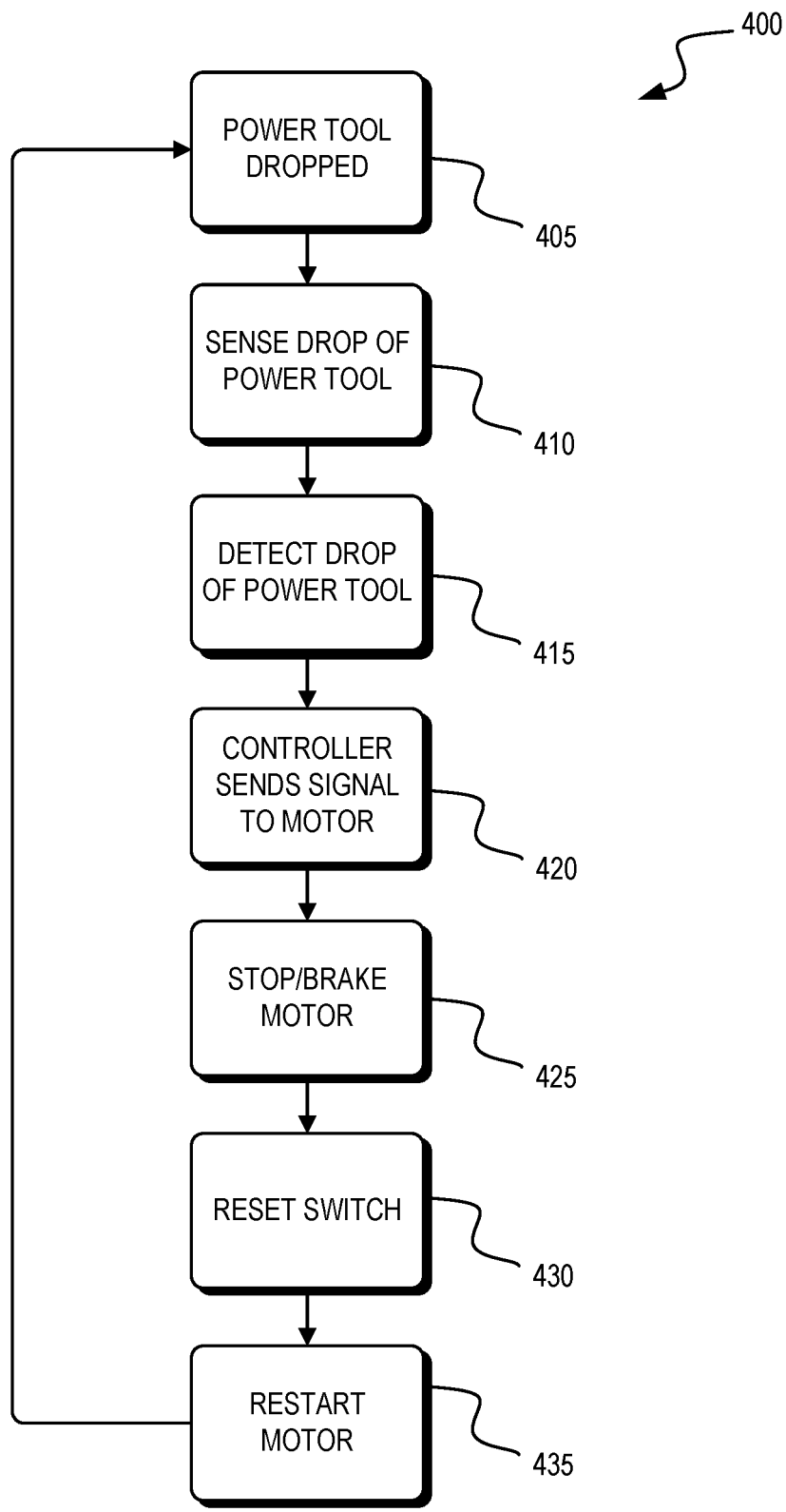
FIG. 4 illustrates a process for controlling a power tool according to embodiments described herein.

FIG. 4 illustrates a process 400 executed by the controller 205 of the device 100 for controlling the shutdown method of a drop detection feature. When a user drops the device (STEP 405), at least one sensor 230 senses the drop (STEP 410) of the device 100.

In some embodiments, the at least one sensor 230 is a gyroscope. When the device 100 is dropped, the gyroscope senses the tool in a free fall from when the device 100 is released (e.g., from a user's hand, off a work table, etc.) in the air until the time the device 100 hits a surface. During this time period of free falling, the gyroscope will detect the drop of the device 100 and send an output signal to the controller, thus triggering a shutdown method. In some embodiments, shutdown is detected based on time free falling such that shutdown can be initiated before the device 100 hits the ground or another object.

In other embodiments, the at least one sensor is an accelerometer. The accelerometer detects an acceleration value with respect to gravity. If that acceleration value corresponds to a predetermined value (e.g., an acceleration of zero during free fall), the controller 205 determines that the tool is accelerating due to the force of gravity and the shutdown method is triggered. In some embodiments, shutdown is detected based on time free falling such that shutdown can be initiated before the device 100 hits the ground or another object.

In other embodiments, the at least one sensor is an inertial measurement unit. The inertial measurement unit may employ a free fall detection method wherein the inertial measurement unit detects a time in which the device 100 is in free fall. A predetermined time threshold is used to determine when the device 100 is dropped is dropped and has been falling for the predetermined time threshold. After the predetermined time threshold is reached, the device 100 is shutdown. Through the free fall time tracking, the inertial measurement unit detects the dropping of the tool and is able to shut down the device 100 without having to collect data of when the device 100 hits an external object (e.g., the ground) or how far the device 100 has fallen.

In some embodiments, if the free fall detection method is resulting in frequent and unnecessary shutdowns of the device 100, additional steps to the method may be applied. In conjunction with acceleration detection from the accelerometer, a total distance moved measurement may be taken to ensure an appropriate shutdown of the device 100. The total distance moved measurement could be the total distance from where the device 100 was being used to perform an operation (e.g., on a workpiece) to where the device 100 hits an external object (e.g., the ground). This method includes a predetermined distance threshold, therefore, if the total distance measurement is too small, the device 100 can remain in operation. If the total distance measurement exceeds the predetermined distance threshold, the device 100 could be considered dropped and triggering the shut-down.

After at least one sensor senses the drop of the device 100, the sensor sends an output signal to the controller 205. The controller 205 then detects the dropping of the device 100 (STEP 415) and sends a control signal (e.g., a braking signal) to the motor within the device 100 (STEP 420). In response to the control signal from the controller 200, the motor ceases operation (STEP 425) (e.g., is braked).

To reset the motor, a switch recycle (e.g., release and reactive the trigger 225) is performed (STEP 430). Once the switch resets, the motor 210 may be restarted (STEP 435) and the method is reset and ready to detect another drop of the device 100, if necessary.

Thus, embodiments described herein provide, among other things, systems and methods for detecting when a device, such as a power tool, is dropped and correspondingly controlling the device. Various features and advantages are set forth in the following claims.

What is claimed is:

1. A power tool comprising:
    a power tool housing;
    a motor within the power tool housing, the motor including a rotor and a stator, the rotor coupled to a motor shaft to produce a rotational output;
    a trigger switch;
    a sensor within the power tool housing, the sensor configured to:
        sense a free fall of the power tool, and
        generate an output signal related to the sensed free fall; and
    a controller including a processor and a memory, the controller configured to:
        receive the output signal from the sensor,
        detect the free fall of the power tool based on the output signal from the sensor,
        determine a period of time that the free fall of the power tool has been detected,
        brake and disable operation of the motor when the free fall of the power tool is detected for a threshold period of time, and
        responsive to detecting a switch recycle of the trigger switch, re-enable operation of the motor.

2. The power tool of claim 1, wherein the sensor is a gyroscope.

3. The power tool of claim 1, wherein the sensor is an accelerometer.

4. The power tool of claim 1, wherein the sensor is an inertial measurement unit.

5. The power tool of claim 1, wherein the power tool is a router.

6. The power tool of claim 1, wherein the power tool further comprises:
    at least one semiconductor switch; and
    a plurality of motor coils.

7. The power tool of claim 6, wherein, when the free fall of the power tool is detected, the controller is further configured to:
    enable the at least one semiconductor switch; and
    shunt the plurality of motor coils to ground.

8. The power tool of claim 1, wherein the controller is further configured to:
    detect when a trigger of the power tool is released; and
    brake the motor when a motor voltage value is below a predetermined threshold.

9. The power tool of claim 1, wherein the controller is further configured to:
    disconnect power to the motor with a power switch to brake the motor when the free fall of the power tool is detected; and
    turn on a brake resistor to dissipate energy from the motor.

10. A method for controlling a power tool during a free fall of the power tool, the method comprising:
    sensing, using a sensor, the free fall of the power tool;
    generating, using the sensor, an output signal related to the free fall of the power tool;
    detecting the free fall of the power tool based on the output signal from the sensor;
    determining a period of time that the free fall of the power tool has been detected;
    braking and disabling a motor when the free fall of the power tool is detected for a threshold period of time; and
    responsive to detecting a switch recycle of a trigger switch, re-enabling operation of the motor.

11. The method of claim 10, wherein the sensor is a gyroscope.

12. The method of claim 10, wherein the sensor is an accelerometer.

13. The method of claim 10, wherein the sensor is an inertial measurement unit.

14. The method of claim 10, wherein the power tool is a router.

15. The method of claim 10, further comprising:
    enabling, after detecting the free fall of the power tool, at least one semiconductor switch; and
    shunting a motor coil to ground.

16. The method of claim 10, further comprising:
    detecting when a trigger of the power tool is released; and
    braking the motor when a motor voltage value is below a predetermined threshold.

17. The method of claim 10, further comprising:
    disconnecting power to the motor with a power switch to brake the motor when the free fall of the power tool is detected; and
    turning on a separate brake resistor to dissipate energy from the motor.

18. A power tool comprising:
    a power tool housing;
    a motor within the power tool housing, the motor including a rotor and a stator, the rotor coupled to a motor shaft to produce a rotational output;
    a sensor within the power tool housing, the sensor configured to generate an output signal related to a free fall of the power tool; and
    a controller including a processor and a memory, the controller configured to:
        receive the output signal from the sensor,
        determine an amount of time that the power tool has been in free fall,
        compare the amount of time that the power tool has been in free fall to a predetermined time threshold,
        brake the motor when the amount of time that the power tool has been in free fall is equal to or greater than the predetermined time threshold,
        disable operation of the motor, and
        responsive to detecting a switch recycle of a trigger switch, re-enable operation of the motor.

19. The power tool of claim 18, wherein the controller is configured to brake the motor while the power tool is in free fall.

20. The power tool of claim 18, wherein the sensor is an accelerometer.

* * * * *